M. BLAKEY.
MACHINES FOR FORMING HOLLOW WELDED CYLINDERS.

No. 175,015.            Patented March 21, 1876.

Witnesses: James P. Kay, Fred. Standish

Inventor: Mildred Blakey by Bakewell & Kerr his attorneys.

UNITED STATES PATENT OFFICE.

MILDRED BLAKEY, OF ETNA, PENNSYLVANIA.

IMPROVEMENT IN MACHINES FOR FORMING HOLLOW WELDED CYLINDERS.

Specification forming part of Letters Patent No. 175,015, dated March 21, 1876; application filed October 28, 1873.

*To all whom it may concern:*

Be it known that I, MILDRED BLAKEY, of Etna, in the county of Allegheny and State of Pennsylvania, have invented a new and useful Method of Making Tubular Metallic Articles; and I hereby declare the following to be a full, clear, and exact description thereof, reference being had to the accompanying drawing, forming a part of this specification, in which—

Figure 1:
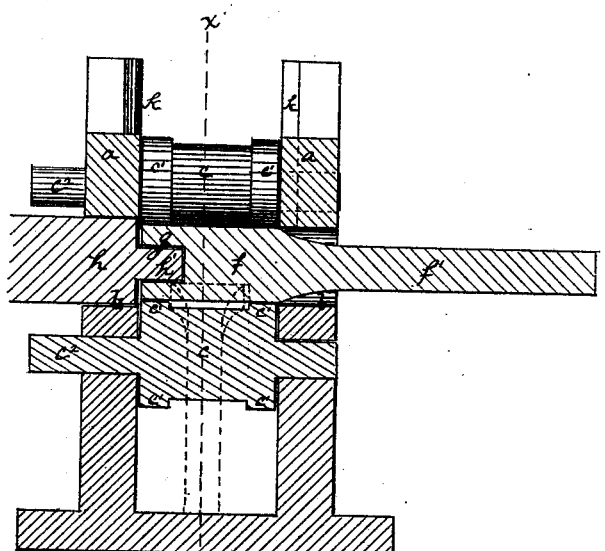
Figure 2:
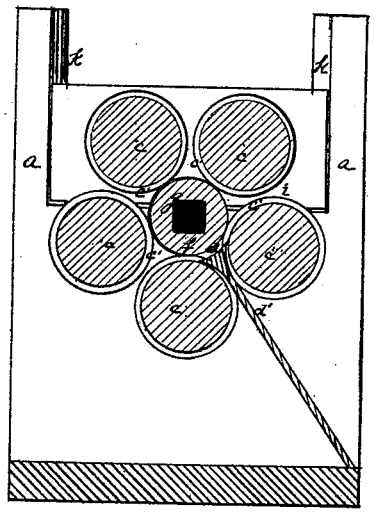
Figure 3:

Figure 1 is a vertical cross-section of a machine embodying my invention, as applied to the manufacture of tubular metallic sockets. Fig. 2 is a section through $x\ x$, Fig. 1. Fig. 3 is a view of the mandrel.

Like letters of reference indicate like parts in each.

My invention consists in an improved machine for the manufacture of wrought-iron tubes, chains, and draw-links, by means of a rotating mandrel, operating in combination with a series of surrounding rolls, which first bend the blank, then weld it, and by continued rolling impart a finish to the welded article.

To enable others skilled in the art to use my invention, I will describe the construction and mode of operation of the machine which I employ in the manufacture of sockets, which are short tubes for connecting the ends of wrought-iron pipes, and for other purposes.

In the housing $a$ I arrange, in a circle around the opening $b$, a series of three or more rolls, $c$. Between the first two rolls is a curved guide, $d$, which is secured upon any suitable support, $d'$, and so arranged as not to interfere with the rotation of the rolls. In the opening $b$ I insert a cylindrical mandrel, $f$, having a reduced end or handle, $f'$, at one end, and a socket, $g$, at its other end, by means of which it is placed upon the hub $h'$ of the rotating shaft $h$. The rolls $c$ are fitted with collars $c'$, which extend to, and are in contact with, the mandrel $f$, and are designed to turn the rolls by the friction of the mandrel. The faces of the rolls are plain, and the width of the opening between is about equal to the thickness of the article to be made.

The operation is as follows: A bar of metal is cut into lengths or blanks suitable for forming a socket of the desired size, and these blanks are heated to a welding-heat and passed, one by one, in at the opening $i$, between the front pair of rolls $c$. The blank thus fed is seized by the first roll and the rotating mandrel, and being bent by the curved die $d$ is drawn by the mandrel and surrounding rolls until it is coiled around the former. The continued rotation of the mandrel $f$ causes the ends of the blank to be welded together and the socket itself to be rolled smooth and perfect. The mandrel $f$ is caused to rotate by the shaft $h$, to which power is communicated in any desired way. After the socket has thus been formed, the mandrel is withdrawn or removed from the rolls and the socket stripped off in any convenient or desired way, and then the mandrel is replaced and the operation repeated. The upper part of the housing moves vertically in the slides $k$, so as to be removable and allow the withdrawal of the mandrel. This construction is unnecessary when the rolls are turned by pinions or pulleys, as there are then no collars $c$ to interfere with the withdrawal of the mandrel. The rolls may be caused to rotate by means of any suitable connection with the shaft $h$, such as by pulleys or pinions upon trunnions. If desired, the mandrel $f$ may be caused to rotate by friction from the rolls instead of itself rotating the rolls. The motion may be communicated by the friction of the blank if the latter is large enough. In that case the collars may be dispensed with. The first two rolls are useful, first, to feed the blank, and, second, to aid the others in bending, welding, and finishing it. One of these rolls may be arranged in relation to the mandrel so that they shall constitute the feeding device.

Instead of the rolls $c$, I can use a circular frame or box, in which I insert friction-rollers, such rollers occupying the position and performing all the functions of the rolls $c$, excepting feeding the blanks. One feeding-roll to operate in combination with the mandrel, or a pair of feeding-rolls to operate as far as feeding is concerned, is necessary. By lengthening the rolls and mandrels, blanks or tubes of any desired length may be welded in this way. By changing the shape of the groove, which is formed by the collars $c'$, this machine may be adapted to welding chain-links, draw-links, and other similar articles.

I am aware that a revolving mandrel with surrounding rolls has been employed for bending sheets of metal into skelps for tubing. I, therefore, do not claim broadly the use of rolls and mandrel for bending metals; but What I do claim is—

1. In combination with a rotating mandrel, a series of surrounding rolls, substantially as described, for bending and welding at one operation.

2. In combination therewith, the guide, arranged substantially as and for the purpose described.

In testimony whereof, I, the said MILDRED BLAKEY, have hereunto set my hand.

MILDRED BLAKEY.

Witnesses:
   JNO. L. ROBERTSON,
   T. B. KENS.